United States Patent [19]
Tremel et al.

[11] Patent Number: 5,524,106
[45] Date of Patent: Jun. 4, 1996

[54] APPARATUS FOR TESTING AN ATM TYPE TELECOMMUNICATIONS NETWORK AND FOR MEASURING THE PERFORMANCE OF AN ATM CONNECTION

[75] Inventors: Jean-Yves Tremel; René Garandel, both of Pleumeur Bodou, France

[73] Assignee: France Telecom, Paris, France

[21] Appl. No.: 326,523

[22] Filed: Oct. 20, 1994

[30] Foreign Application Priority Data

Oct. 20, 1993 [FR] France ................... 93 12521

[51] Int. Cl.⁶ .................... H04L 12/26; H04L 12/56
[52] U.S. Cl. .................... 370/13; 370/60.1; 370/94.2
[58] Field of Search .................... 370/13, 14, 17, 370/60, 60.1, 79, 82, 94.1, 94.2, 99, 100.1, 105.1, 105.3, 106, 110.1; 375/357, 365, 366, 371, 373; 371/5.1, 5.4, 5.5, 37.1, 42, 47.1; 380/3, 4, 36, 37; 395/200, 325, 425, 725, 800

[56] References Cited

U.S. PATENT DOCUMENTS

| | | | |
|---|---|---|---|
| 5,163,057 | 11/1992 | Grupp | 371/47.1 |
| 5,251,204 | 10/1993 | Izawa et al. | 370/13 |
| 5,280,470 | 1/1994 | Buhrke et al. | 370/13 |
| 5,313,454 | 5/1994 | Bustini et al. | 370/13 |
| 5,343,462 | 8/1994 | Sekihata et al. | 370/13 |
| 5,373,504 | 12/1994 | Tanaka et al. | 370/60.1 |

FOREIGN PATENT DOCUMENTS

A-0393351 10/1990 European Pat. Off. .
A-0520580 12/1992 European Pat. Off. .

OTHER PUBLICATIONS

Satoru Ohta et al., *Applying OSI Systems Management . . . Testing in ATM Networks*, IEICE Transactions On Communications, vol. E76–B, No. 3, Mar. 1993.

G. I. Stassinopoulos et al., *Real Time Testing of Adaptation Layer in IBCN*, 6th Mediterranean Electrotechnical Conference, vol. 1, May 1991.

*Primary Examiner*—Alpus Hsu
*Attorney, Agent, or Firm*—Nilles & Nilles

[57] ABSTRACT

An apparatus for testing an ATM type telecommunications network and for measuring the performance of connections of the network, the network conveying information elements in the form of cells according to the ATM standard. To this end, the apparatus includes a transmitter provided with a set for the preparation of the physical layer and a set for the preparation of the ATM transport layer organized into virtual paths and virtual channels (VP/VC), a receiver provided with a set for the processing of the signals of the physical layer and a set for the processing of the flow of cells of the ATM transport layer. Application to telecommunications in ATM mode.

19 Claims, 8 Drawing Sheets

▨ 2 FRAME-LOCKING BYTES
▧ 5+48 BYTE ATM CELLS

CONTENTS   MEASUREMENT SIGNAL x:00:00:00 
x:01:00:00 
x:01:01:00 
x:01:02:00 
x:01:nn:00  FOR nn FROM 0 TO 254
x:01:255:00 
x:01:255:01

APPARATUS FOR TESTING AN ATM TYPE TELECOMMUNICATIONS NETWORK AND FOR MEASURING THE PERFORMANCE OF AN ATM CONNECTION

BACKGROUND OF THE INVENTION

1. Field of the Invention

The invention relates to an apparatus for testing an ATM type telecommunications network and for measuring the performance of an ATM connection. It may be recalled that an ATM (Asynchronous Transfer Mode) telecommunications network enables the transmission of digital data elements having varied bit rates that could be high. These bit rates could indeed go up to 155 Mbits per second and even more.

2. Description of the Prior Art

Transmission in ATM mode is done by the transfer of information blocks of a constant length. The elementary quantity of useful information transmitted is 48 bytes. The information block transmitted in ATM is called a cell and identified by a five-byte label called a header. The total length of a cell is therefore 53 bytes.

The technique of transmission in ATM mode is based on the placing of the information in cells. The transfer network then takes charge of switching, multiplexing and transmitting these cells.

The transfer network is a shuffling or switching network that uses the ATM transmission mode and does not directly manage the basic communication, placed in the form of cells, but a group of multiplexed communications in a bundle of cells.

Apart from the transfer function, the network also takes charge of generating and terminating these bundles in service or network multiplexers.

Finally, the network makes use of the independence of the asynchronous transfer mode (ATM layer) with the transmission systems to use the plesiochronous and the synchronous network (physical layer).

The parameters of quality of an ATM connection have been defined in the CCITT Recommendation No. I356.

On the basis of this definition of the parameters, the present Applicant has defined two types of tools needed for the testing of network elements and for the measurement of the performance characteristics of the network:

a tool for testing the ATM functions whose role is to measure the performance characteristics of a given connection by simulating load conditions on the other connections. To this end, there is provision for testing mechanisms for the different layers of the protocol, namely ATM and AAL (ATM adaptation layer). There is also provision for simulating the influence of the physical layer by the controlled generation of configuration errors etc., and for simulating the influence of the ATM layer by generating jitter, insertion or cell loss phenomena.

The second tool is a tool for the testing of operational functions enabling the validation of the capacities of equipment and of the network, to fulfil the specified functions: interface, maintenance and signalling.

To date, there is no apparatus that can be used to measure the performance parameters of an ATM network and test the operational functions of the network.

The problem that the Applicant has sought to resolve relate to a new need consisting in the devising of an ATM testing and measuring apparatus for the putting into operation of an ATM connection whether at the level of the testing of the network element or that of the measurement of the performance of the network. According to one aspect of the invention, the measuring apparatus consists of either one or two items of equipment. The measuring apparatus has one piece of equipment when the network tests are performed in a loop, as shown in FIG. 1Aa. It has two pieces of equipment when tests are performed from point to point between two distant centers as shown in FIG. 1Ab. Only one piece of equipment is used for monitoring functions in FIG. 1Ac. To facilitate the description hereinafter, it shall be assumed that the measuring apparatus has two pieces of equipment, one transmitter and one receiver-analyzer hereinafter called a receiver.

SUMMARY OF THE INVENTION

To this end, an object of the invention is an apparatus for testing an ATM type telecommunications network and/or network elements and for measuring the performance of connections of the network, said network conveying information elements in the form of cells according to the ATM standard, wherein said apparatus comprises:

A. A transmitter provided with:

a) a set for the preparation of the physical layer, said set comprising:

cell scrambling means, error corrector code generation means, means to generate maintenance cells, error insertion means;

b) a set for the preparation of an ATM transport layer organized into virtual paths and virtual channels (VP/VC) comprising:

means to generate the flow of user cells including measurement cells and load cells, means for the formation of a flow of cells from the cells generated by temporal multiplexing on several layers organized in A virtual circuits and virtual channels of measurement and B virtual circuits and virtual channels for loading;

B. A receiver provided with a set for the processing of the signals of the physical layer comprising:

means for the detection of a lack of signals, loss of frame synchronization signals and loss of cell synchronization signals;

b) a set for the processing of the cells of the ATM transport layer comprising:

means for the descrambling and delineation of the cells, user cell recognition means, measurement cell recognition means, performance measurement means (erroneous, lost and inserted cells, jitter) and cell storage means.

The transmitter also includes means for the formation of a frame formed by N bytes including (N–M) information bytes and M frame-locking bytes.

The frame formation means comprise a counter that can be used to make a time-gap clock (HTR) for the insertion of the M frame-locking bytes every N bytes.

The frame formation means furthermore include parallel-series conversion means to transmit the bytes forming the cells in series form and an encoder enabling the encoding of the series bits to transmit them on the transmission line of the network.

The cell scrambling means are formed by a synchronous scrambler in $x^{31}$, the frame-locking bytes being not scrambled.

The physical layer preparation means comprise vacant cell insertion means.

The error corrector code computation means, the scrambling means and the vacant cell insertion means are formed by a circuit constituted by a network of logic cells.

The means enabling the generation of flows of measuring and loading cells comprise a programmable memory containing a first set of blocks, each block containing the header bytes and information bytes of the load cells and a second set containing the headers of the measuring cell.

The means for generation of the flow of measuring and load cells furthermore include a counter whose value is repeated in each byte of a cell, the counter being incremented by 1 at each new cell to be generated.

The means for the generation of the flow of ATM cells furthermore includes traffic generation means.

The traffic generation means may comprise a programmable memory wherein each bit corresponds to a cell of the frame, the 0 or 1 state of this bit enabling or not enabling the controlling of the transmission of a measurement cell.

The traffic generation means may include a programmable memory in which each byte corresponds to a distance between two measurement cells.

The maintenance cell (F3) generation means comprise:

a time base to obtain byte synchronization, block synchronization and cell (F3) synchronization signals enabling the periodic and enforced transmission of a maintenance cell F3 every NIC cells transmitted, means for the transmission of the header of the maintenance cells and of the information field.

The receiver comprises frame-locking and series-parallel conversion means.

The frame-locking means comprise a frame decoding circuit comprising a decoder that can be used to obtain a binary signal, a series-parallel converter, a shifter, a frame-locking automaton and a frame-locking word comparator.

The means for the recognition of the measurement cells comprise comparators enabling the comparing of the user cells received with the headers of the measurement cells.

The performance measurement means and cell storage means comprise a processing unit for the processing of the measurement cells that is capable of counting the inserted and lost cells and the number of errors detected in the erroneous cells.

The receiver furthermore comprises a memory that enables the real-time reading of the measurement results, their storage in a mass-storage memory and the analysis of the traffic received.

The memory can be used to store the received cells, filter them, if necessary, with a view to deferred processing (protocol analysis, maintenance).

BRIEF DESCRIPTION OF THE DRAWINGS

Other particular features and advantages of the invention shall appear from the following description made with reference to the appended drawings, of which.

MORE DETAILED DESCRIPTION

The device that shall be described hereinafter is aimed at meeting a novel need, namely that of the testing and measurement of performance parameters of an ATM type telecommunications network for the putting into operation of an ATM type connection.

Figure 1A:
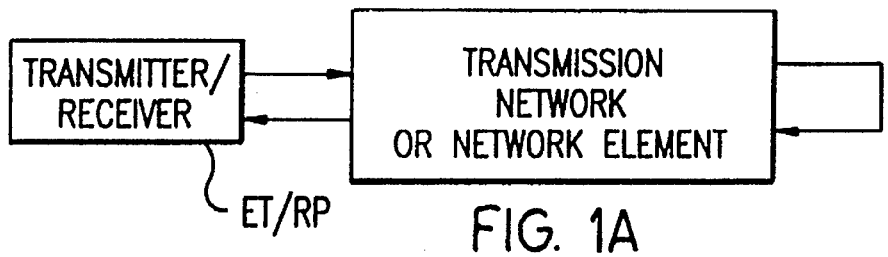
FIGS. 1A, 1B and 1C show the three possible testing configurations possible by means of the testing device according to the invention.
Figure 1B:
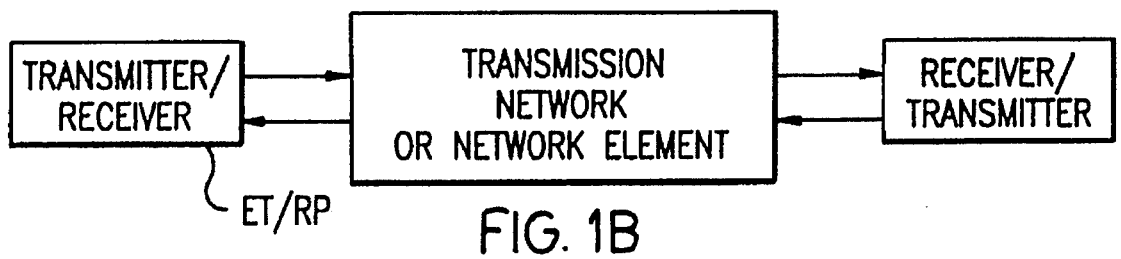
Figure 1C:
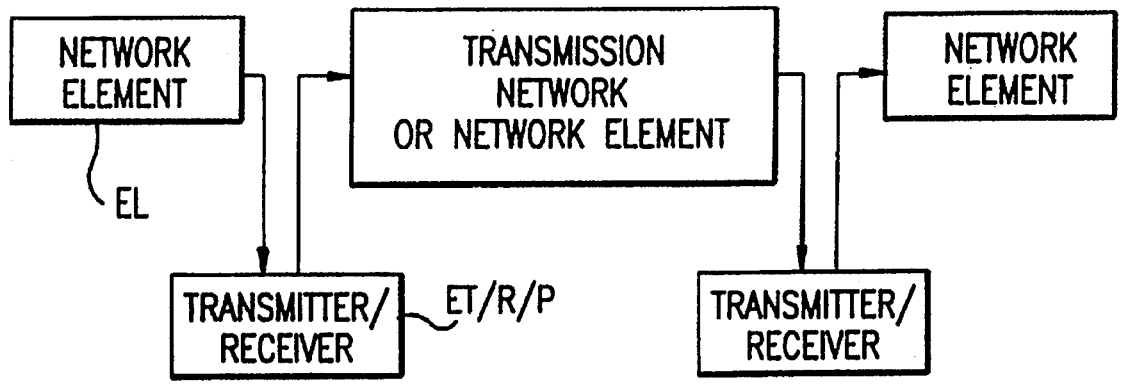

This measurement apparatus is formed by either one or two pieces of equipment according to the invention. The apparatus will be formed by a piece of equipment when the tests on the network are set up in a loop as shown in FIG. 1A. The device will be formed by two pieces of equipment when the tests are carried out on a point-to-point basis between two distant centers as shown in FIGS. 1B and 1C.

Figure 1D:
FIG. 1D shows a diagram of the organization of the data in the form of a 34 Mbit/s frame.

The cells forming the flow projected on the network may be organized in frames as can be seen in the diagram of FIG. 1D. The projection of the cells on the network, whether or not the cells are organized in frames, is done by means of a standardized interface that can be used to obtain the desired bit rate. This bit rate may be one of 34 Mbit/s or 255 Mbit/s.

In the rest of the description, the example chosen is that of a 34 Mbit/s interface.

As has already been specified, the ATM standard enables a temporal multiplexing at several levels by the organizing of the flow of cells in virtual paths (VP) and virtual channels (VC). Thus, all the ATM cells may be assigned to one virtual path among 4096 and to one virtual channel VC among 65536. The paths and virtual channel numbers of the cell are contained respectively in 12 and 16 bits of the header. Thus, a five-byte header whose bits are numbered from 0 to 7 contains the virtual path number VPI defined on 12 bits, the virtual channel number VCI defined on 16 bits, a cell type indicator PT (payload type) defined on 3 bits, a priority indicator CLP (cell loss priority) defined on 1 bit as well as an error corrector code HEC defined on 8 bits and relating to the four preceding bytes.

The header is followed by 48 information bytes reserved for the useful data elements.

Figure 2A:
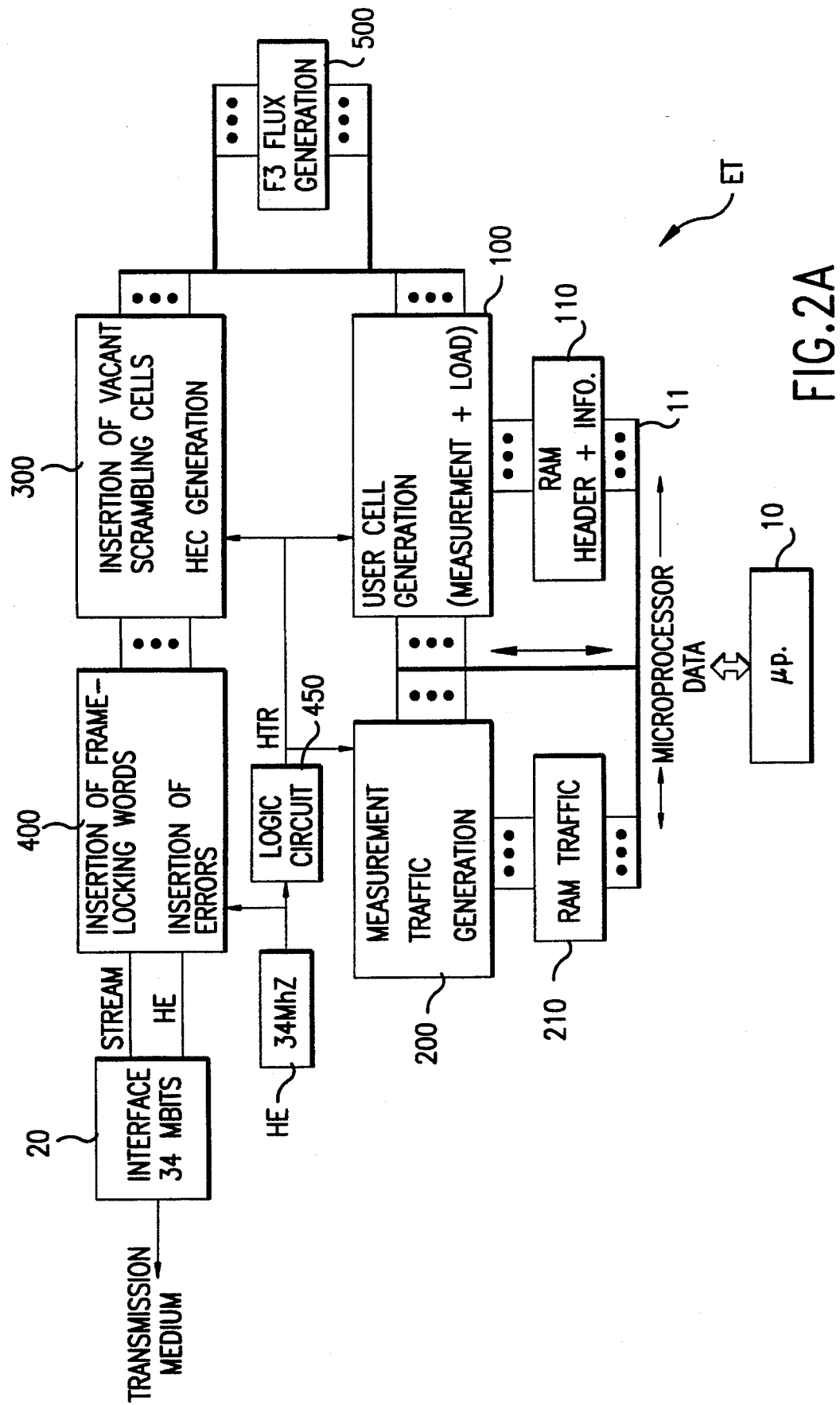
FIG. 2A shows a schematic drawing of the transmitter according to the invention.

Reference shall now be made to the general diagram of the transmitter part ET of the apparatus shown in FIG. 2A. The set of processing operations relating to the data elements received is handled by a processing unit 10 formed by a microprocessor.

The transmitter part furthermore has an interface 20 for connection to the transmission medium. It is formed by means for the generation of user cells 100 enabling the generation of the measurement cells and of the load cells, these means being associated with a RAM type memory 110 in which the contents of the cell to be generated have been recorded.

The transmitter also has measurement traffic generation means 200 associated with a RAM type memory 210 the reading of which enables the sending of either a transmission control signal of a measurement cell or a data element whose value corresponds to the distance between two measurement cells.

The memories 210 and 110 are dual-access RAM memories.

The transmitter furthermore has means 300 for the insertion of vacant scrambling cells and for the generation of error correction code and means 400 for the insertion of frame-locking words and error insertion words. It also has means 500 for the generation of the maintenance flux F3.

The means for the insertion of the frame-locking word 400 are associated with a logic circuit 450 that can be used to obtain a clock signal HTR hereinafter called a time-gap clock, whose gap or interval lasts for the frame-locking time.

Figure 2B:
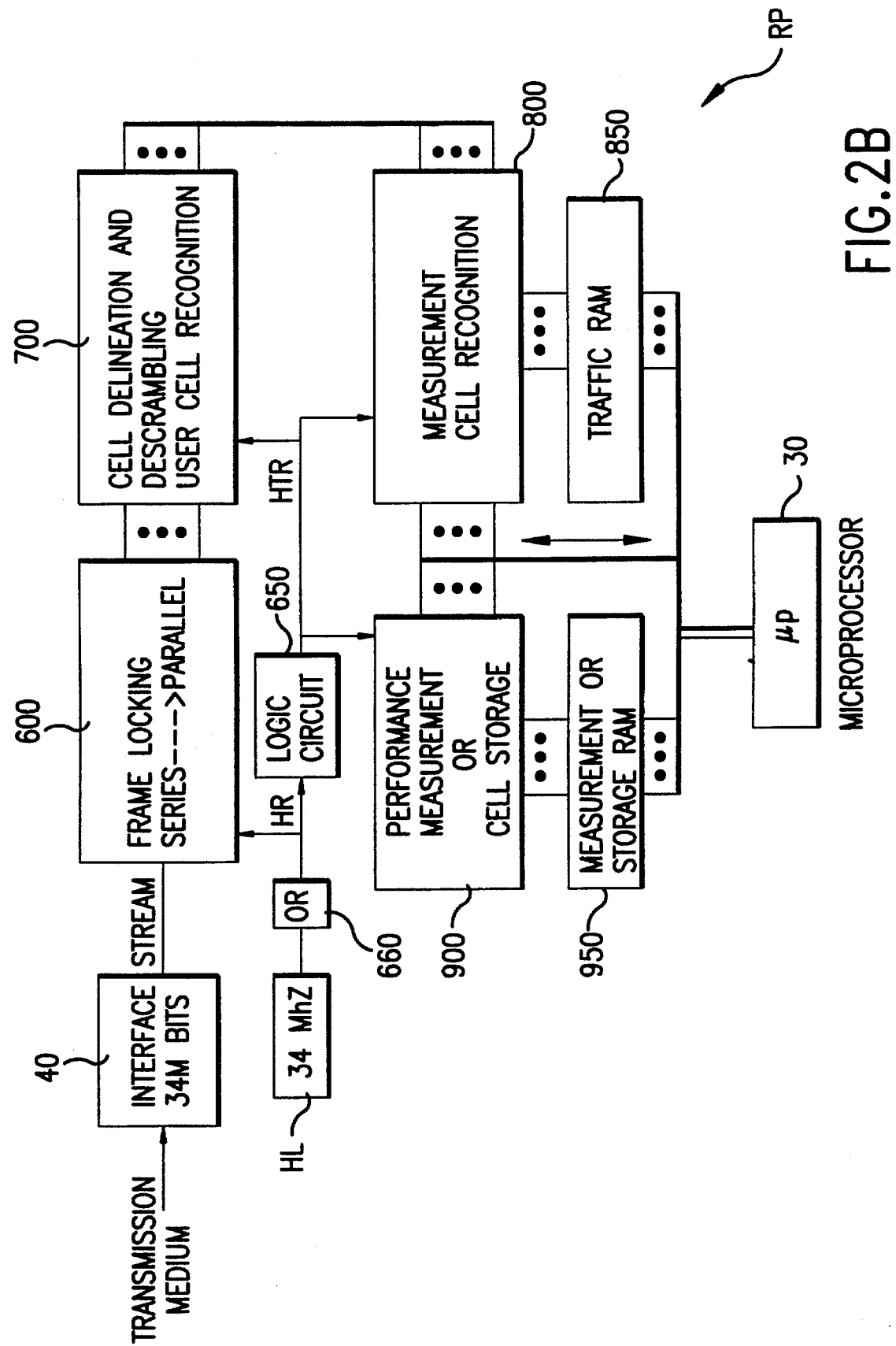
FIG. 2B shows a diagram of a receiver according to the invention.

FIG. 2B shows the diagram of the different sets forming the receiver RP according to the invention. The receiver is fitted out with a local clock HL used to obtain a reception clock signal HR having the same frequency as the transmission clock, i.e. in the case of the example described the clock HR is equal to 34 MHz. The receiver is also fitted out with a reception interface 40 to enable the connection to the ATM network, the interface being formed by a standardized existing circuit.

The receiver has a unit 30 for the processing and managing of all the signals. This unit is of the microprocessor type and, in practice, is formed by the same processing unit as the one placed in the receiver.

It is for example a 68030 microprocessor using a real-time operation system OS9. The receiver furthermore has a set 600 for frame-locking and for the series-parallel conversion of the data stream coming from the interface 40. The receiver also has a set 700 for the descrambling, delineation and recognition of user cells. The receiver is also provided with a set for the recognition of the measurement cells 800 associated with traffic storage means 850. The receiver furthermore has means 900 for the measurement of the performance or for the storage of the cells associated with measurement storage means 950.

The frame-locking means 600 are associated with a logic circuit used to obtain the reception clock signal HR. Another logic circuit 650 is used to obtain a frame-locking clock signal HTR.

A more detailed description shall now be given of the different sets forming the transmitter firstly and then the receiver.

However first of all, it must be specified that, according to the invention, the transmitter will be used to send a flow of cells meeting the ATM standard including vacant cells and user cells and maintenance cells referenced F3 and F4. The user cells are all the cells transmitted (or received) for the ATM layer, namely all the cells transferred on the line apart from vacant cells and maintenance cells.

The user cells comprise:

measurement cells: information cells that enable the measurement of the ATM transfer network. An eight-bit counter, incremented at each measurement cell, is used to load the 48 information bytes of the measurement cell;

Contents:

VPi (virtual path) on 12 bits

VCI (virtual channel) on 16 bits

PT (payload type) on 3 bits

CLP (cell loss priority) on 1 bit

HEC (header error corrector) on 8 bits and 48 times the same byte.

load cells: information cells used to load the access to the network. The contents of the 48 information bytes of the load cells come from the RAM 110.

Contents:

VPi on 12 bits

VCI on 16 bits

PT on 3 bits

CLP on 1 bit

HEC on 8 bits and 48 bytes coming from the memory.

Description of the Transmitter Part ET

Figure 3:
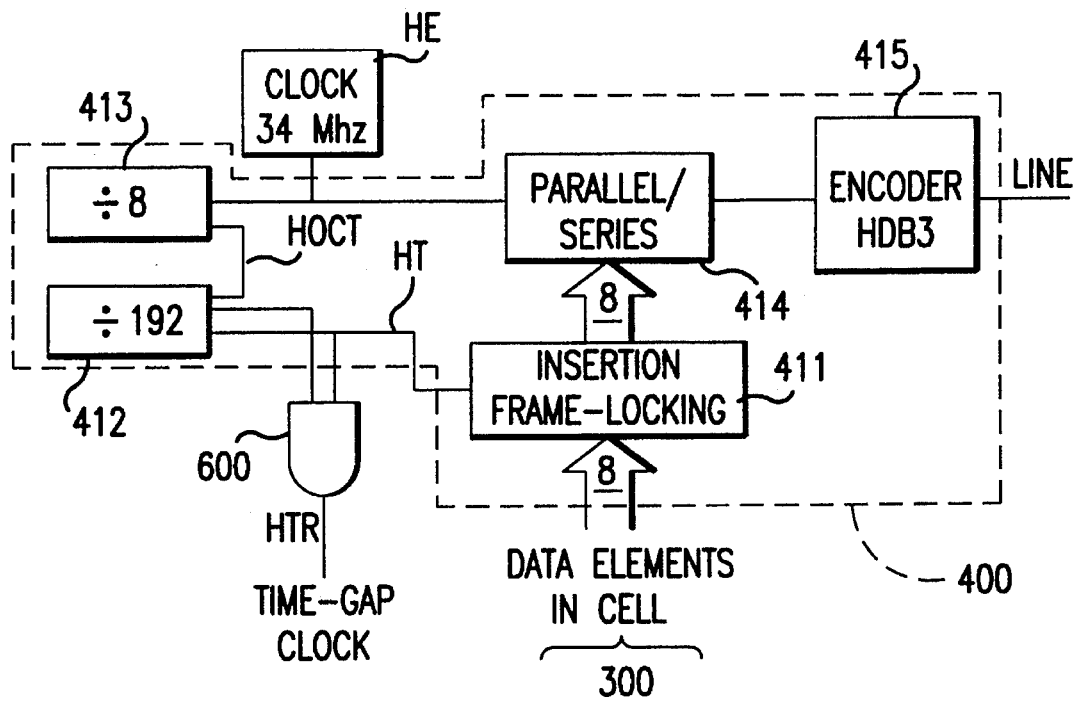
FIG. 3 shows the means for the formation of a frame according to the invention.

FIG. 3 shows an embodiment of the set 400 used for the insertion of the frame-locking mode and for the insertion of errors.

According to the example taken, the ATM cells are projected on a 192-byte frame. The frame therefore has 190 information bytes in which the ATM cells are located and two locking bytes. The frame-locking bytes used have the hexadecimal value of F4 and 10, namely 1111010000010000, the most significant bits are sent first. In order to obtain a farmed structure of the data elements, a counter by 192 (reference 412 in FIG. 3) is used to generate a frame-locking clock signal HT. A register 411 is used for the insertion, at the rate given by the frame clock, of the frame-locking words, said register receiving the data of the cells coming from the set 300. The eight-bit words coming out of the register 411 in parallel are serialized by means of a parallel-series converter 414. The binary data stream is then encoded by an encoder 415 using HDB3 type encoding, and then injected into the line of the transmission network.

Figure 4:
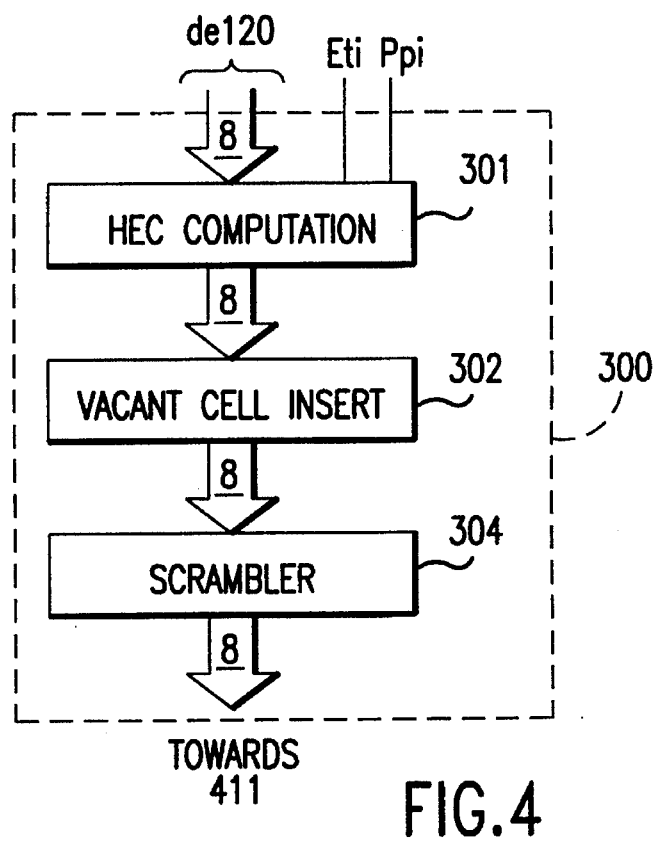
FIG. 4 shows a set for the preparation of the physical layer according to the invention.

FIG. 4 illustrates an embodiment of the means for the insertion of vacant cells, scrambling cells and cells for the generation of error correction codes, these means comprising three functional sets. One set for the computation of error correction codes HEC bearing the reference 301 receives the information from ATM cells from the cell generation set 100. At one input Eti, it also receives a permanent signal indicating the envelope of the cell. This input receives a signal which is at 1 during the header of the cell and at 0 during the cell type indicator. The set 301 also has an input Bpi which receives a signal in state 1 in the presence of user or measurement cells.

The set 302 may be formed by means of a register in which the contents of the vacant cell have been recorded. These contents correspond to the value in hexadecimal mode for the header: 00 00 00 01 52 and the value 6A for the 48 information bytes.

A synchronous scrambler in $x^{31}$ bearing the reference 304 is then used to scramble the cells, the locking bytes being not scrambled.

In practice, this set 300 is formed by a logic cell array type of network LCA.

Figure 5:
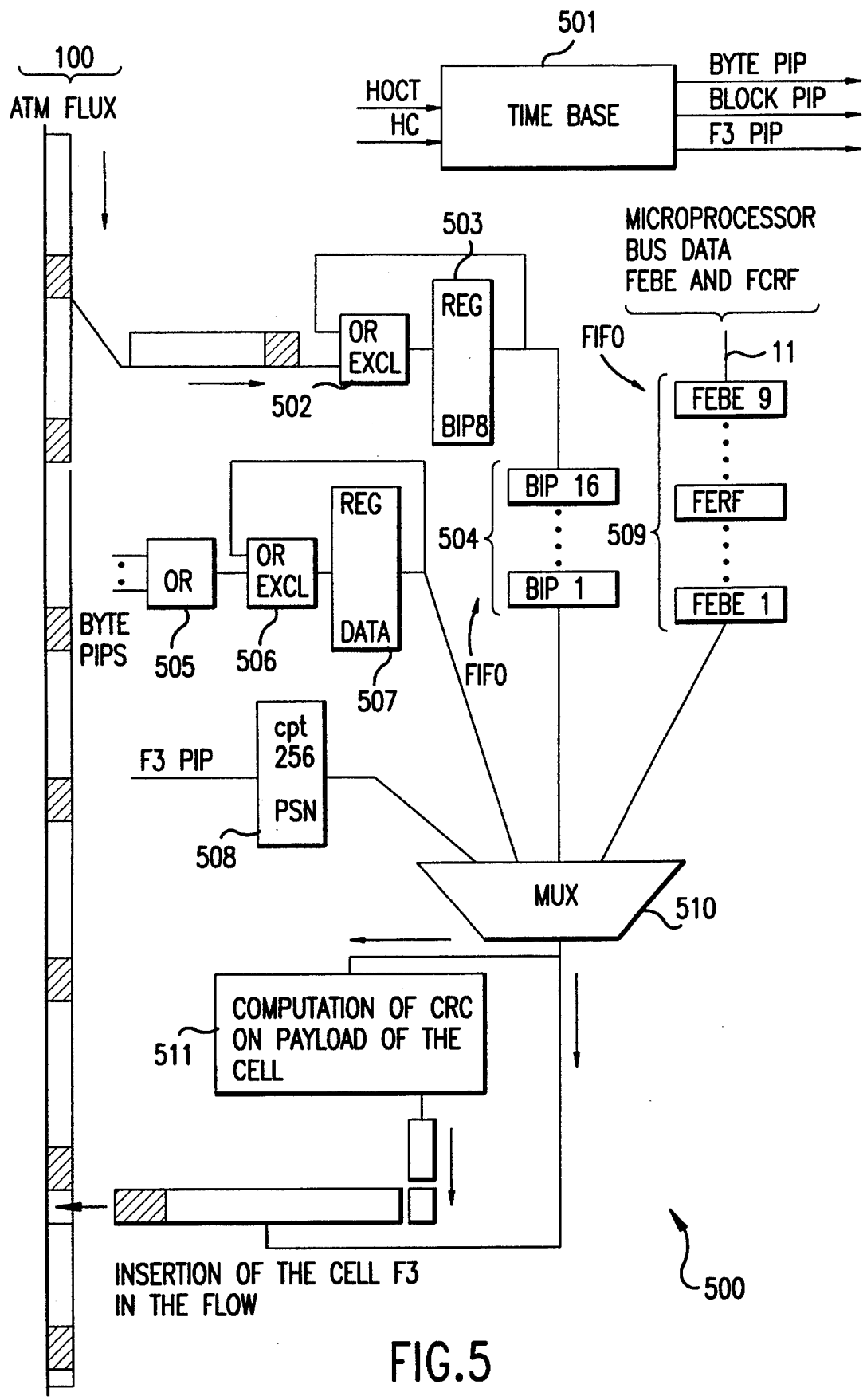
FIG. 5 shows the means for the generation of maintenance cells.

FIG. 5 shows the set 500 used to generate maintenance cells F3.

This set enables the periodic and forced transmission of a cell F3 every NIC (number of included cells). For example, NIC has been chosen to be equal to 256.

The set also enables these NICs to be divided into NMB blocks of MBS cells. In practice, 256 cells have been divided into 16 blocks of 16 cells.

Indeed, as a particular example, the following values have been chosen:

NMB (number of monitored block)=16 blocks

MBS (monitoring block size)=16 cells.

According to the invention, a maintenance cell F3 contains notably:

a particular header enabling the extraction of the flow of cells at reception.

a) An error detection code relating to the binary flux of a block of MBS cells transmitted (header and information field). This code is an BIP8 obtained by an OR-Exclusive gate, bit by bit, on the bytes and does not relate to the maintenance cell F3.

b) A sequence number PSN of the cell F3 generated modulo 16.

c) A number of inserted cells NIC capable of giving, up to modulo 1024, the number of cells transmitted from the previous cell F3. This number is modulo 256 in the example of 34 Mbit/s.

d) The size of the monitored blocks at origin NSB giving the constant number of cells transmitted per block for all the blocks covered by the error detection mechanisms (BIP).

e) The original number of monitored blocks ONMB giving the number of blocks that are transmitted between two cells F3 and covered by the error detection mechanisms.

f) the number of blocks monitored at destination DNMB giving the number of transmitted blocks covered by the information elements on detected parity infringements (FEBE).

g) the information on FEBE (far end block error) is an information element transmitted towards the associated far end, giving the number of parity infringements detected at reception through the BIP8 code.

h) the FERF (far end receive failure) information transmitted towards the associated far end to indicate one of the following:

cell synchronization loss, the loss of maintenance flow at reception.

i) All the unused bytes contain the hexadecimal value 6A.

j) An error detection code on the information field of the maintenance cell F3. This code is a CRC10.

FIG. 5 shows the set of functional blocks of the circuit for the transmission of the flow of maintenance cells F3. According to a preferred embodiment, this circuit is an LCA type circuit. It has a time base capable of generating the byte pips, the block pips and the F3 pips on the basis of the byte clock signal HOCT and the clock signal HC relating to the presence of a header.

The flow of cells coming from the set 100 is applied to the input of an OR-EXCLUSIVE gate 502 whose output is applied to the input of a register 503, the second input of the gate 502 receiving the output of the register 503. As already described, this set makes it possible to obtain the error corrector code BIP8. The computation of BIP8 by 16-cell blocks is recorded in a first-in/first-out (FIFO) type of stack referenced 504. The generation of the fixed bytes of a maintenance cell F3 is obtained by an OR gate 505 followed by an OR-Exclusive logic gate 506 and a register 507.

The sequence number PSN is obtained from a counter by 256 which receives F3 pips. This counter is referenced 508 in the drawing.

The information element FEBE is sent by the processing unit and arrives by the data bus of this unit which bears the reference 11. These information elements are stored in a first-in/first-out (FIFO) type of stack referenced 509 in the drawing. The information of a maintenance cell F3 is obtained at the output of a multiplexer 510 which receives, at its inputs, the data elements coming from tile counter 508, the register 507, the stack 504 and the stack 509.

An error corrector code computation on the indicator of the type of cell is added in tile field corresponding to the cell coming from the multiplexer 510 before the insertion of the cell into the flow of ATM cells.

It is recalled that the user cells are all the cells transmitted or received for tile ATM layer, namely all the cells transferred to the transmission line apart from the vacant cells and the cells of the maintenance flow.

We shall now see the way in which these user cells are generated. According to the invention, the user cells correspond either to measurement cells that contain an information element enabling the measurement of the ATM transfer network or to load cells. They are information cells used to load the access to the network. The contents of the 48 information bytes of the load cells come from a RAM type memory. An eight-bit counter is used to load the 48 bytes of information elements of the measurement cells, this counter being incremented at each measurement cell as shall be seen hereinafter.

The transmission of vacant cells or load cells or measurement cells is controlled by the processing unit 10 which activates the reading of a RAM type memory hereinafter called a traffic RAM bearing the reference 210 in FIG. 6.

This memory has a 0 whenever a vacant cell or a load cell has to be transmitted and a 1 whenever a measurement cell has to be transmitted.

According to a first method of controlling the traffic, each bit of the traffic memory 210 corresponds to a cell of the 34 Mbit/s frame.

When the bit is at 0, there is no transmission of measurement cells. When the bit is at 1, there is a transmission of a measurement cell. It is furthermore possible, by the programming of the transmission counters, to enable transmission in a single operation or continuously with scanning of the memory 210 at intervals of about every 25 seconds. The traffic memory of the virtual channels and of the virtual paths is accessible in dual-access mode by the microprocessor 10 and by the transmitter.

Figure 6:
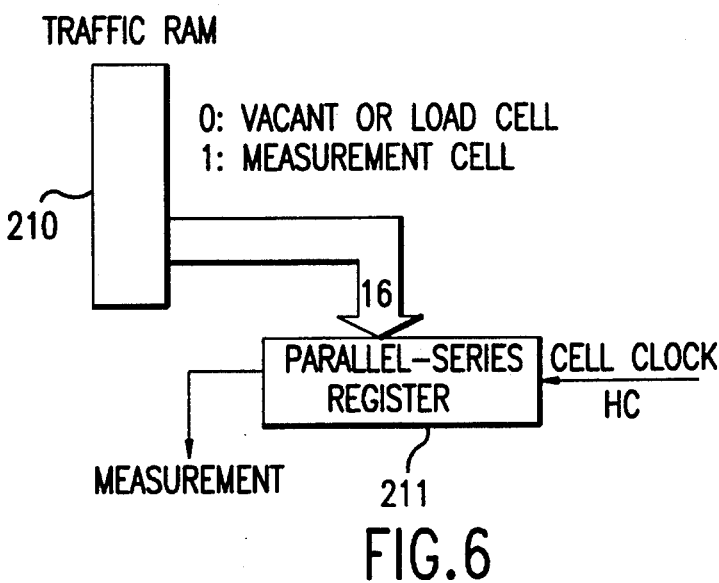
FIG. 6 shows the traffic generation means.

FIG. 6 illustrates the method implemented to generate traffic by using this encoding. The values are read in the memory 16 bits by 16 bits. A parallel-series register 211 controlled by the cell clock HEC enables the generation of a measurement output at 1 only during the presence of a measurement cell.

According to another method that can be used, each byte of the traffic memory corresponds to a distance between two measurement cells. When the contents of the memory are equal to 255, the contents of the next memory are added to 255 to give the distance.

Figure 7:
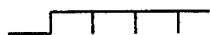
FIG. 7 shows the relationship between the memory of FIG. 6 and the generated measurement signal HM.
Figure 7:
Figure 7:
Figure 7:
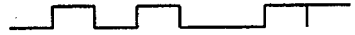
Figure 7:
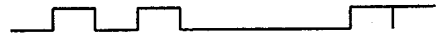
Figure 7:
Figure 7:

FIG. 7 illustrates the relationship between the contents of the memory and the measurement signal generated. The encoding according to second method enables a generation of traffic of greater duration.

In the remaining bit rate (total bit rate minus allocated bit rate VP/VC of measurement) it is possible to make periodic transmission of the load cells. The period is programmable.

The transmitter may transmit either no load cell or a load cell with 0 to 256 vacant cells. This percentage of load cells is obtained by the programming of a register 130 from the processing unit 10.

The contents of the load bit rate register is:

0 which corresponds to a maximum load (no vacant cells), 1 which corresponds to a vacant cell, a load cell, etc., 2 which corresponds to two vacant cells, one load cell etc., 255 which corresponds to 255 vacant cells, one load cell etc.

Figure 8:
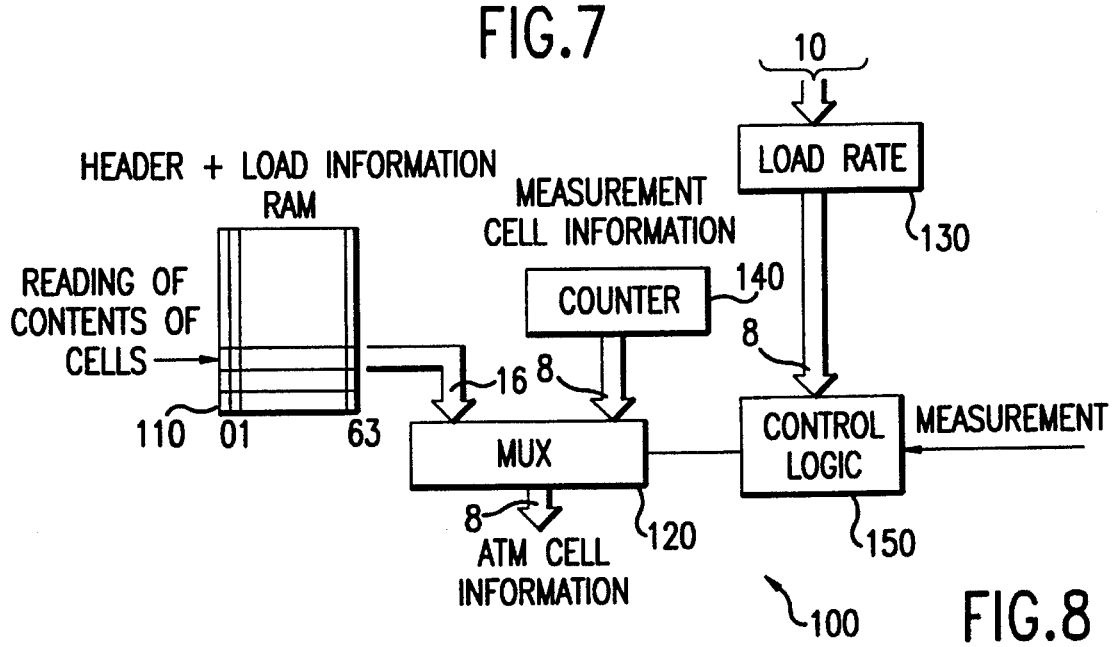
FIG. 8 shows the means for the generation of the user flux.

FIG. 8 illustrates the functional blocks enabling the generation of the resultant ATM flow.

The measurement signal indicates the presence of a measurement cell. This signal is generated from the traffic memory as explained further above.

The information field of each measurement cell is filled by a counter 140 of 8 bits repeated 48 times. The header of the measurement cells comes from the memory 110 as also does the header and the information field of the load cells.

As already explained, the user, through the processing unit 10, may program the rate of load cells to the VP/VC chosen. A control logic circuit 150 enables the sending of the ATM flow selected by the users.

The control logic 150 receives, for this purpose, the measurement signal as well as the load rate of the register 130 and controls the multiplexer so that the bytes coming from the counter or coming from the memory are recovered at output to form the ATM cells.

The sets 100, 200, 300 and 400 as well as the set 500 shown in FIG. 2A, that have just been described, are formed by means of LCA type circuits.

A more detailed description shall now be given of the receiver part.

Figure 9:
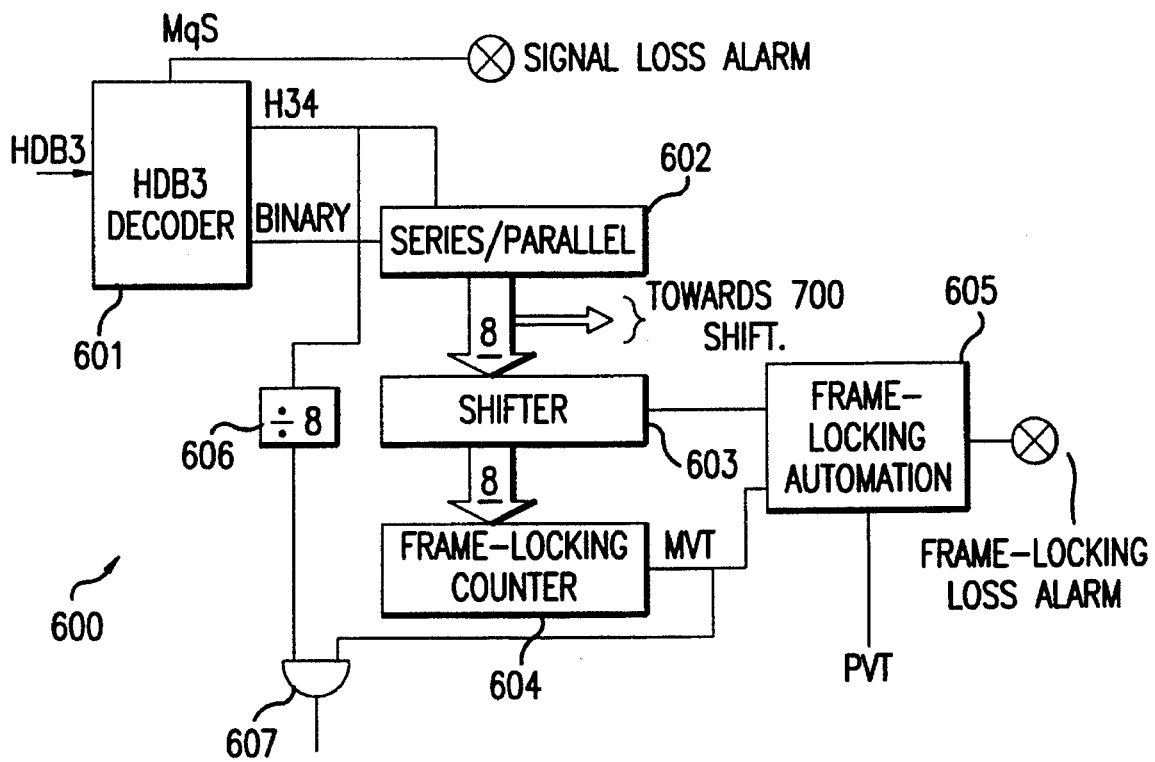
FIG. 9 shows the diagram of the frame decoding means.

The frame-locking means represented in FIG. 2B by the block 600 have been shown in greater detail in FIG. 9. These means have, first of all, a decoder HDB3 which receives the binary data stream from the transmission medium. This decoder enables the decoding of the 34 Mbit/s frame. It enables the activation of an alarm in case a lack of signal is detected. It furthermore makes it possible to obtain a clock signal H34 and a binary data stream applied to the input of a series-parallel converter 602. The byte synchronization is obtained by means of the series-parallel converter of a shifter 603, a frame-locking comparator 604 and a frame-locking automaton 605.

The clock signal H34 is applied to the input of a multiplier by eight bearing the reference 606. The output of the multiplier and the frame-locking signal are applied to the inputs of an AND logic gate 607 to obtain the clock signal which will enable the other circuits to be controlled.

Figure 10:
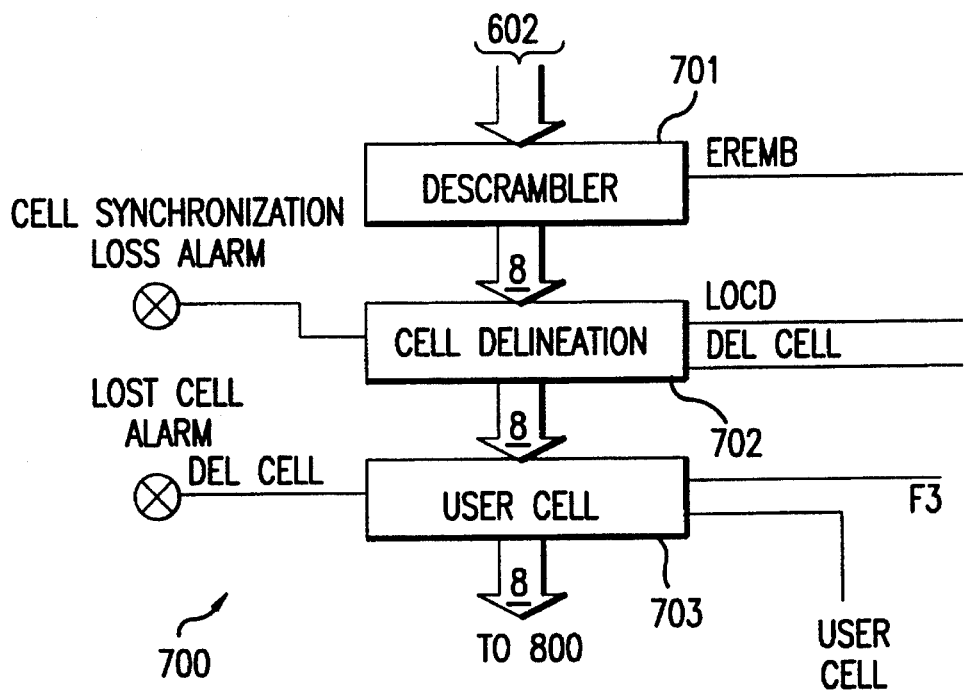
FIG. 10 shows the diagram of the making of the descrambling, delineation and cell recognition means.

FIG. 10 illustrates the ATM physical circuit. It has an descrambler 701 which receives the bytes coming from the series-parallel converter 602, a cell delineation circuit 702 and a user cell recognition circuit 703. The set shown in FIG. 10 has been formed by means of an LCA type circuit and is used to obtain information on defects:

LOCD in the event of loss of cell delineation, these information elements being counted;

EREMB in the event of scrambling errors;

DELCELL in the case of cells destroyed for false error corrector codes.

The circuit further enables the activation of an alarm in the event of loss of cell synchronization and in the event of lost cells. It also enables the sending of a signal for the recognition of user cells and the signal for the recognition of a maintenance cell F3.

The signal indicating that an error corrector code is erroneous makes it possible, after the counting of the number of cells destroyed, to compute the rate of cells destroyed.

Figure 11:
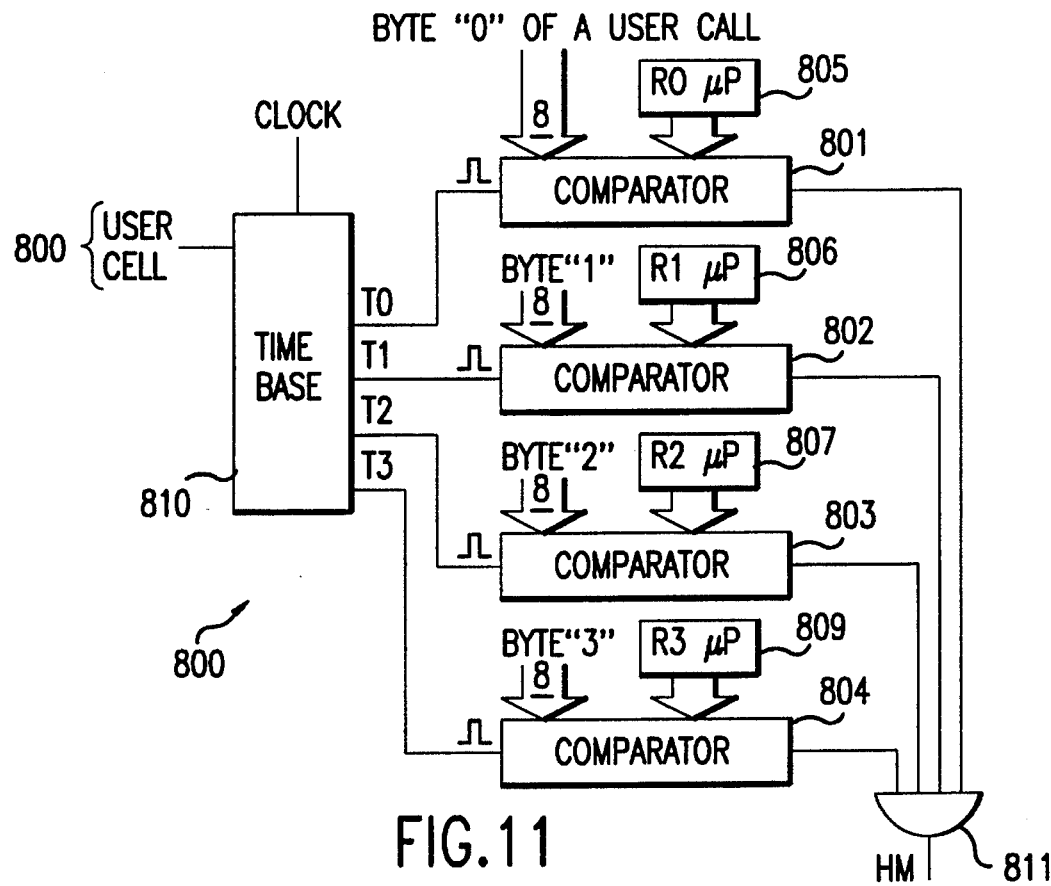
FIG. 11 shows the diagram of the making of the measurement cell recognition means.

FIG. 11 shows the set of functional blocks needed for the recognition of the measurement VP/VC. This set also is formed by an LCA type circuit. The value of the VP/VC to be measured is placed in registers of the LCA circuit and this value is compared with the value of the VP/VC received by means of comparators 801–804.

Figure 12:
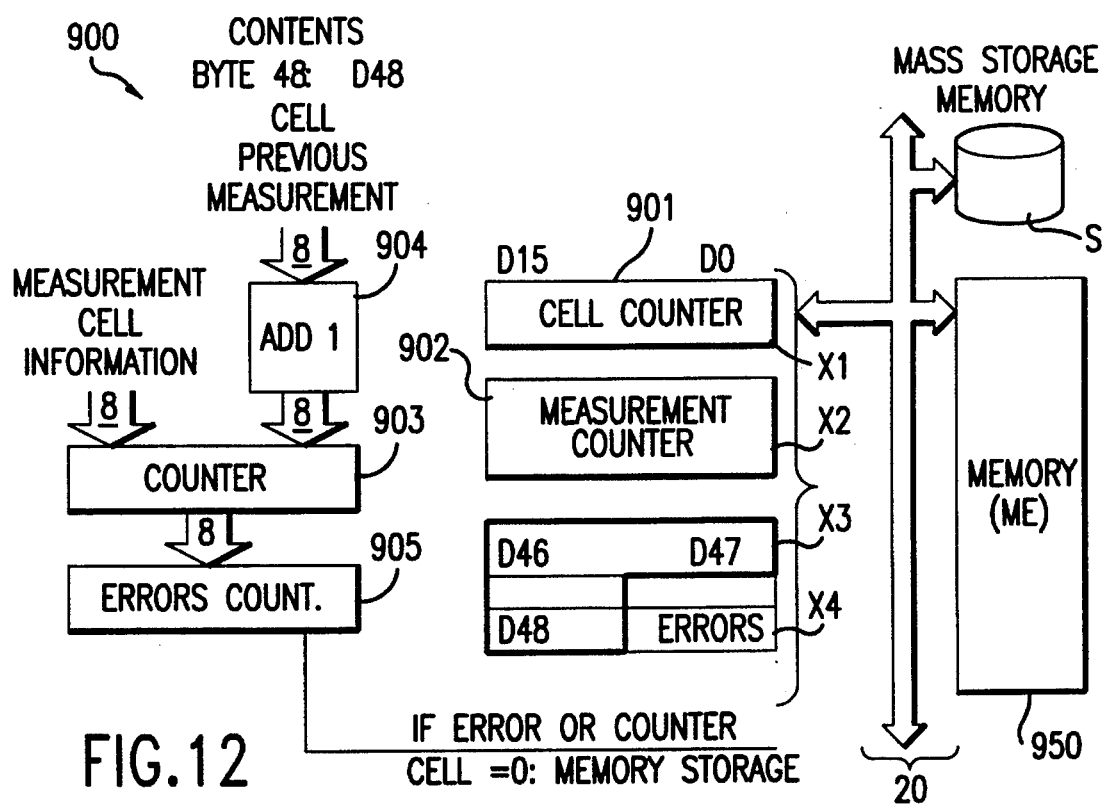
FIG. 12 shows the diagram of the making of the cell storage and performance measurement means.

The comparisons will relate to the header bits of cells. It may be provided, for example by programming, that a bit at 1 will indicate that the corresponding bit of the header could take any value and that a bit at 0 will indicate that the corresponding bit of the header will be effectively compared with the corresponding bit of one of the registers 805 to 809. A logic gate 811 enables the delivering of a signal HM representing the number of measurement cells recognized. The set 900 shown in FIG. 12 can be used to process the measurement cells in order find out the rate of lost, inserted and erroneous cells, the number of cells received, namely the vacant cells, the measurement cells and the load cells. This number is obtained by means of a 16-bit counter 901 giving the information element X1 corresponding to the number of the cell.

The number of measurement cells is obtained by means of a 16-bit counter 902 giving the information element X2 corresponding to the measurement cell number. These information elements X1, X2 are stored in a dualsaccess RAM type memory 950.

Four other bytes are also stored. These are the byte D48 of the information part of the cell received, the byte D47 of the information part of the cell received, the byte D48 of the information part of the cell received and the output of an eight-bit counter counting errors on the information bytes, the counting being stopped when the number of errors reaches 255.

The information element X3 stored in the memory 950 corresponds to the bytes D46, D47, D48 and the information element X4 corresponds to the number of errors obtained by the counter. These eight bytes are stored in the memory 950 when the error counter is different from 0 or when the cell counter has reached the value 65365.

The memory is managed in dual-access mode. The central processing unit 30 may process the memory in real time, compress the data and periodically save the information acquired in a mass-storage memory S for deferred processing.

The information elements stored in the random-access memory 950 and then in the mass memory S enable the counting and dating of all the events that have appeared on an ATM path. It is possible, on the basis of the information elements X1, X2, X3, X4, to compute the number of inserted, lost or erroneous cells. To obtain the computation of errors in a received cell, an eight-bit comparator 903 is available. This comparator 903 compares the values of eight bits coming from the information field of the measurement cell received with the value of eight bits coming from the adder register 904. This adder register contains the value contained in the information field of the previous cell incremented by 1.

The result of each comparison is transferred to an adder 905 carrying out a counting of errors. The number of errors is obtained at the end of 48 comparisons for the cells having 48 information bytes. To obtain the measurement of jitter, an analysis is made of the variation of the distance between measurement cells, this information being contained in the traffic memory 850.

To obtain the transfer time of the network, there is provision for sending a specific cell, with a recognizable header, in the network, this cell being also recorded in the memory 950. A loop test is carried out i.e., the cell is sent out into a looped network as is shown in the diagram of FIG. 1A. At reception, the cell is stored in the memory 950. The distance, in terms of cells, between the transmission of the specific cell and its reception is then known. The transfer time of the network is deduced therefrom. Reference may be made to the detailed description of the measurement cell processing means made in the patent application filed by the present Applicant under U.S. Ser. No. 08/191,399, filed on Feb. 3, 1994 and allowed on Jun. 22, 1995.

What is claimed is:

1. An apparatus for testing an ATM type telecommunications network or network elements and for measuring the performance of connections of the network, the network conveying information elements in the form of cells on a physical layer and an ATM transport layer according to the ATM standard, the apparatus comprising:

A. a transmitter including
      a) means for preparing the physical layer, the physical layer preparing means further comprising:
         means for scrambling cells,
         means for generating error correction codes,
         means for generating maintenance cells,
         means for inserting errors in cells;
      b) means for preparing the ATM transport layer organized into virtual paths and virtual channels, the ATM transport layer preparing means further comprising:
         means for generating user cells including measurement cells and load cells,
         means for forming a flow of cells, the flow being formed by a temporal multiplexing of the scrambled cells, the error correction codes, the maintenance cells, the cells having errors inserted therein, and the user cells on several layers organized in (a) virtual paths and virtual channels of measurement and (b) virtual paths and virtual channels for loading;
   B. a receiver including
      a) means for processing the signals of the physical layer;
      b) a means for processing the cells of the ATM transport layer further comprising:
         means for descrambling and delineating the flow of cells,
         means for recognizing user cells, the user cells having been descrambled and delineated from the flow of cells,
         means for recognizing measurement cells, the measurement cells having been descrambled and delineated from the flow of cells,
         means for measuring the performance of the network with respect to the transmission of the scrambled cells, the error correction codes, the maintenance cells, the cells having errors inserted therein, and the user cells,
         means for storing the cells descrambled and delineated from the flow of cells.

2. A testing apparatus according to claim 1, wherein the transmitter further includes means for forming a frame having N bytes including N–M information bytes and M frame-locking bytes.

3. A testing apparatus according to claim 2, wherein the frame forming means comprises a counter used to set up a time-gap clock for the insertion of the M frame-locking bytes every N bytes.

4. A testing apparatus according to claim 2, wherein the frame forming means further comprises parallel-series conversion means for transmitting the bytes forming the cells in series form and an encoder for encoding the series bits to transmit them on the transmission line of the network.

5. A testing apparatus according to claim 1, wherein the means for scrambling cells comprises a synchronous scrambler, the frame-locking bytes being not scrambled.

6. A testing apparatus according to claim 1, wherein the means for preparing the physical layer comprise vacant cell insertion means.

7. A testing apparatus according to claim 6, wherein the means for generating error correction codes, the means for scrambling cells and the vacant cell insertion means are formed by a circuit constituted by a network of logic cells.

8. A testing apparatus according to claim 1, wherein the means for generating measurement cells and load cells are associated with a programmable memory containing a first set of blocks, each block containing the header bytes and information bytes of the load cells, and a second set containing the headers of the measurement cells.

9. A testing apparatus according to claim 1, wherein the means for generating measurement cells and load cells further include a counter whose value is repeated in each byte of a cell, the counter being incremented by 1 for each new cell generated.

10. A testing apparatus according to claim 1, wherein the means for forming a flow of cells further includes traffic generation means.

11. A testing apparatus according to claim 10, wherein the traffic generation means comprises a programmable memory in which each bit corresponds to a cell of the frame, the 0 or 1 state of this bit enabling or not enabling the controlling of the transmission of a measurement cell.

12. A testing apparatus according to claim 10, wherein the traffic generation means include a programmable memory in which each byte corresponds to a distance between two measurement cells.

13. A testing apparatus according to claim 1, wherein the means for generating the maintenance cells comprises:

a time base to obtain byte synchronization, block synchronization and cell synchronization signals enabling the periodic and enforced transmission of a maintenance cell following every transmission of a predetermined quantity of cells, and means for transmitting the header of the maintenance cells and the information field.

14. A testing apparatus according to claim 1, wherein the receiver further comprises frame-locking and series-parallel conversion means.

15. A testing apparatus according to claim 14, wherein the frame-locking means comprises a frame decoding circuit further comprising a decoder that obtains a binary signal, a series-parallel converter, a shifter, a frame-locking automaton and a frame-locking word comparator.

16. A testing apparatus according to claim 14, wherein the means for recognizing the measurement cells comprises comparators for comparing the user cells received with the headers of the measurement cells.

17. A testing apparatus according to claim 14, wherein the means for measuring performance and the means for storing cells comprise a processing unit for processing the measurement cells, the processing unit counting the inserted and lost cells and the number of errors detected in the cells having errors inserted therein.

18. A testing apparatus according to claim 14, wherein the receiver comprises a memory for reading in real-time the measurement results, for storing the measurement results in a mass-storage memory and for analyzing the traffic received.

19. A testing apparatus according to claim 14, wherein the memory stores the received cells thereby permitting deferred processing of the cells.

* * * * *